INVENTOR.
WILLIAM HARGRAVE
BY
F. Ledermann
ATTORNEY

Patented Nov. 2, 1943

2,333,564

UNITED STATES PATENT OFFICE 2,333,564

HOT PAN LIFTER

William Hargrave, Marathon, N. Y.

Application November 5, 1942, Serial No. 464,595

5 Claims. (Cl. 294—29)

This invention relates to kitchen accessories or utensils, and its main object is the provision of a useful, practical, efficient and compact device, which is at the same time simple in operation and inexpensive in cost of manufacture, whereby hot pans or the like may be readily removed from an oven without any danger of burning of the person.

Another object of the invention is the provision of an auxiliary handle means whereby, in the case of relatively heavy pans or pots, the device may be lifted with both hands and in such manner that the weight is more evenly, and with better balance, distributed.

The above and other objects will become apparent in the description below, wherein characters of reference refer to like-numbered parts in the accompanying drawing which forms a part hereof. It is to be noted that the drawing is intended to serve the purpose of illustration only, and it is not desired nor intended to limit the invention necessarily to the exact details of construction shown excepting insofar as they fall within the spirit and scope of the appended claims.

Referring briefly to the drawing.

Figure 1:
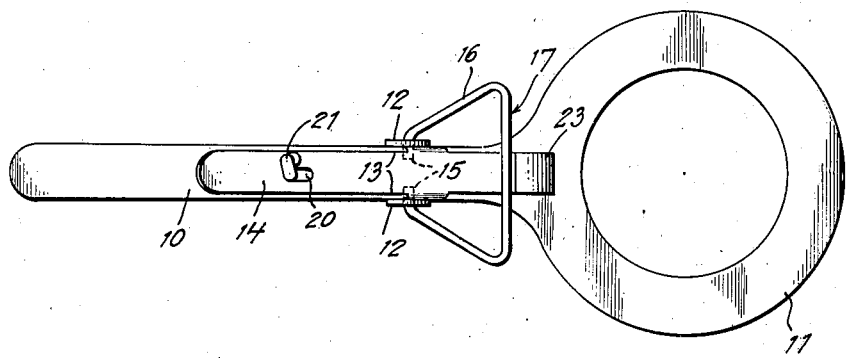
Fig. 1 is a plan view of the device.
Figure 2:
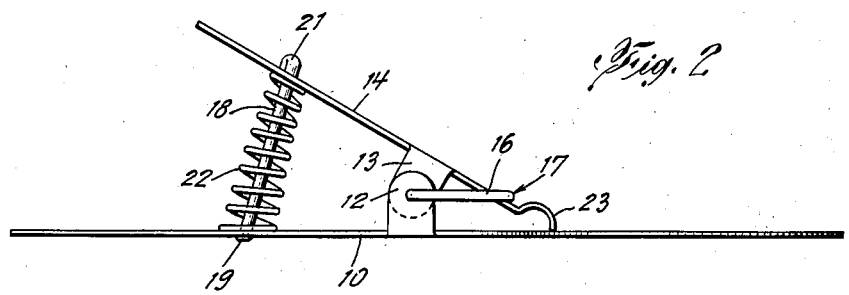
Fig. 2 is a side elevational view of the same.
Figure 3:
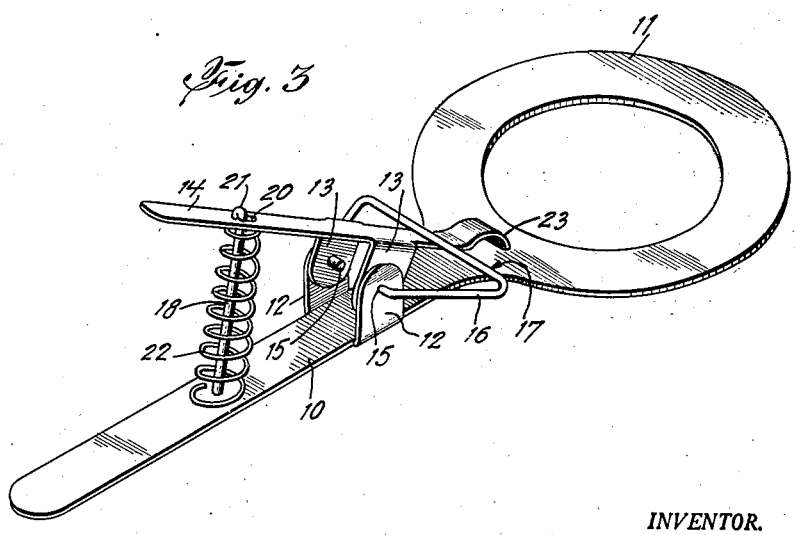
Fig. 3 is a perspective view of the device.

Referring in detail to the drawing, the numeral 10 represents a flat elongated member or handle having a flat annular extension 11 on one end thereof, both members 10 and 11 lying in the same plane.

Near the extension 11, the handle 10 is provided with a pair of opposed upright ears 12 having aligned openings therethrough. A second somewhat less elongated flat member 14 has a similar pair of opposed ears 13 extending at right angles therefrom and similarly provided with aligned openings. The pairs of ears 12 and 13 are pivotally mounted on the aligned extremities 15 of a substantially triangular-shaped wire grip 16, so that the member 14 may be pivotally moved about the axis 15—15 with respect to the handle 10. It is to be noted that the yoke 17 of the member 16 passes over the upper surface of the member 14.

A rod or stem 18 is anchored at 19 in the handle 10 and extends upward at a forward inclination. The upper end of the stem 18 passes through a short longitudinal slot 20 in the member 14 and the extremity 21 thereof is doubled back to provide a limit stop against the clockwise rotation of the member 14; the doubled back extremity 21 is also widened somewhat as shown in Fig. 1 in order to prevent the same from passing through the slot 20. A conically coiled spring 22 surrounds the stem 18 between the members 10 and 14 in such manner that it normally urges the member 14 into clockwise rotation about its pivot. A downwardly projecting hook 23 is formed on the extremity of the upper member 14.

The device is operated and applied in the following manner. Assuming that there is a hot pan or pot in the oven or on the stove which it is desired to remove, the flat annular extension 11 is first slipped under the pot or pan, which is a simple operation in view of the flatness of this extension. Before the extension 11 has been shoved home under the pan, however, the member 14 is pressed down (which may be done by the thumb with the device held on one hand) to lift the hook 23 above the wall of the pan, not shown. Then the extension 11 is shoved home and the member 14 released, whence the hook 23 will be urged by the spring 22 against the upper edge of the pan wall. The pan may then be readily lifted out of the oven by means of the handle 10.

In the event that the pan is a heavy one so that it would be difficult to remove with one hand, the yoke 17 of the member 16 may be grasped with the other hand as soon as the pan has been slid a short distance forward from the oven, and thus the device with the pan on the extension 11 may be lifted out by the aid of both hands.

Obviously, modifications in form and structure may be made without departing from the spirit and scope of the invention.

I claim:

1. A device of the class described comprising a flat elongated handle having an annular extension thereon lying in the same plane thereof, a second flat member pivotally mounted thereon intermediate the length thereof and at a distance above said handle, a stem anchored in said handle and extending upward at a forward tilt, said member having a slot therein, said stem passing through said slot and having the upper extremity thereof deformed, a coiled spring surrounding said stem and normally urging said member to rotate about its pivotal mounting to bring one end thereof down toward said extension, said end of said member having a downwardly extending hook thereon.

2. A device of the class described comprising a flat elongated handle having a flat annular extension thereon lying in the same plane as said handle, a pair of upright ears extending in opposed relationship from said handle intermediate the length thereof, a second flat member positioned above said handle and having a pair of opposed ears extending downward therefrom, said ears having openings therethrough, said openings being aligned and having pivots passing therethrough to pivot said member on said handle, a stem anchored in said handle and extending upward at a forward tilt, said member having a slot therein, said stem passing through said slot and having the upper extremity thereof doubled back against said member, a coiled spring surrounding said stem and normally urging said member to rotate about said pivots and to bring one end thereof down toward said annular extension, and a downwardly projecting hook on said end of said member.

3. A device as set forth in claim 2, wherein additional handle means is provided integral with said pivots.

4. A device of the class described comprising a flat elongated handle having a flat ring integral therewith on one end thereof lying in the same plane as said handle, a pair of upright opposed ears on said handle intermediate the length thereof, a substantially triangular-shaped wire grip having its extremities mutually aligned and spaced apart, a second flat member having a pair of opposed ears extending downward therefrom, said ears having openings therethrough, said openings being aligned and having said grip extremities inserted therethrough to provide pivots for said pairs of ears, said member having a hook on one end thereof, said hooked end of said member passing between said grip and said handle, a spring mounted between said handle and said member near the outer ends thereof to urge said hooked end of said member normally toward said extension, and means secured in said handle and said member for maintaining said spring in position therebetween.

5. A device as set forth in claim 2, wherein a substantially triangular-shaped grip is provided integral with said pivots.

WILLIAM HARGRAVE.